Jan. 18, 1955
D. FISHER
2,699,792
VEHICLE WASHER
Filed Nov. 14, 1949
3 Sheets-Sheet 1
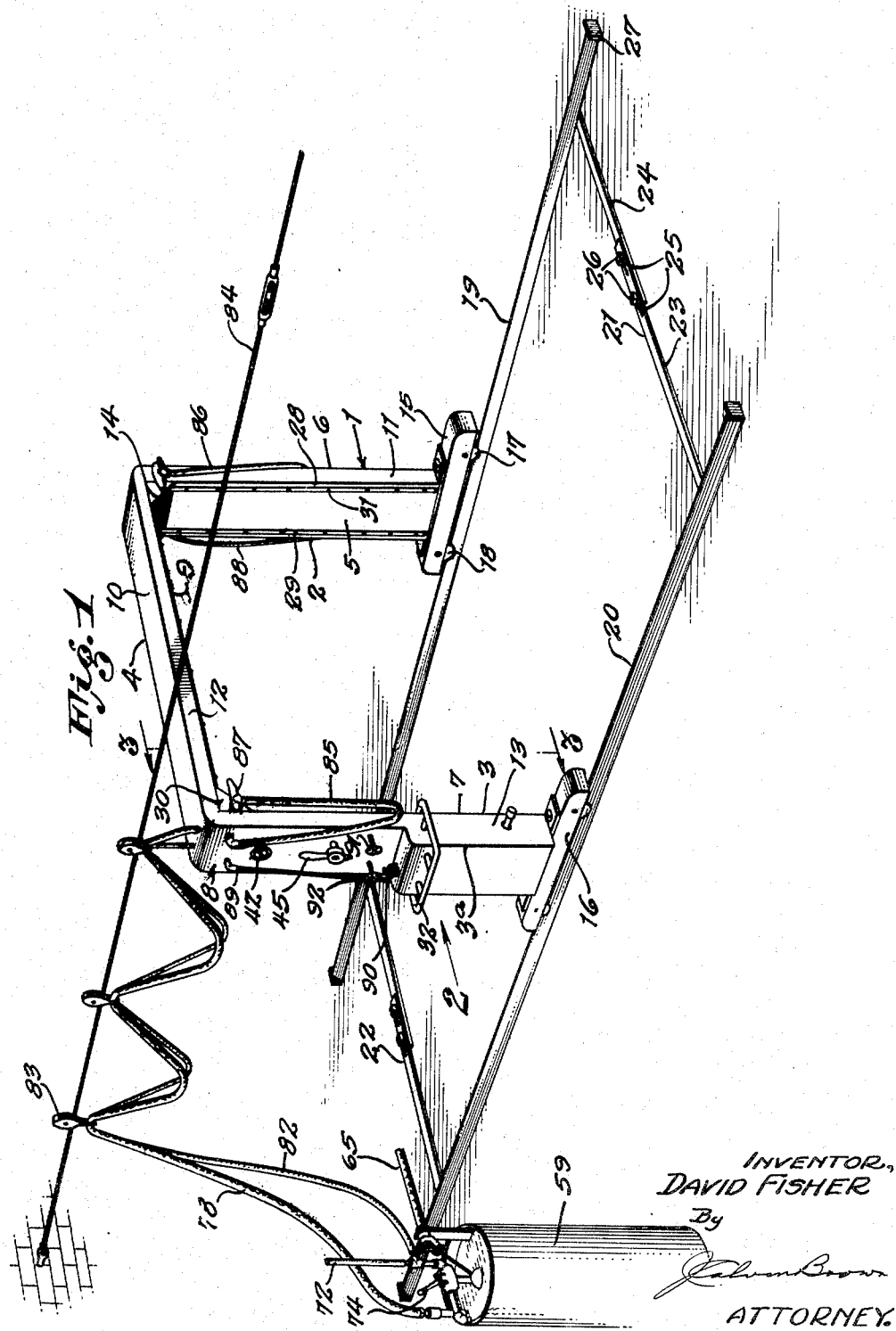
INVENTOR,
DAVID FISHER
By
ATTORNEY.

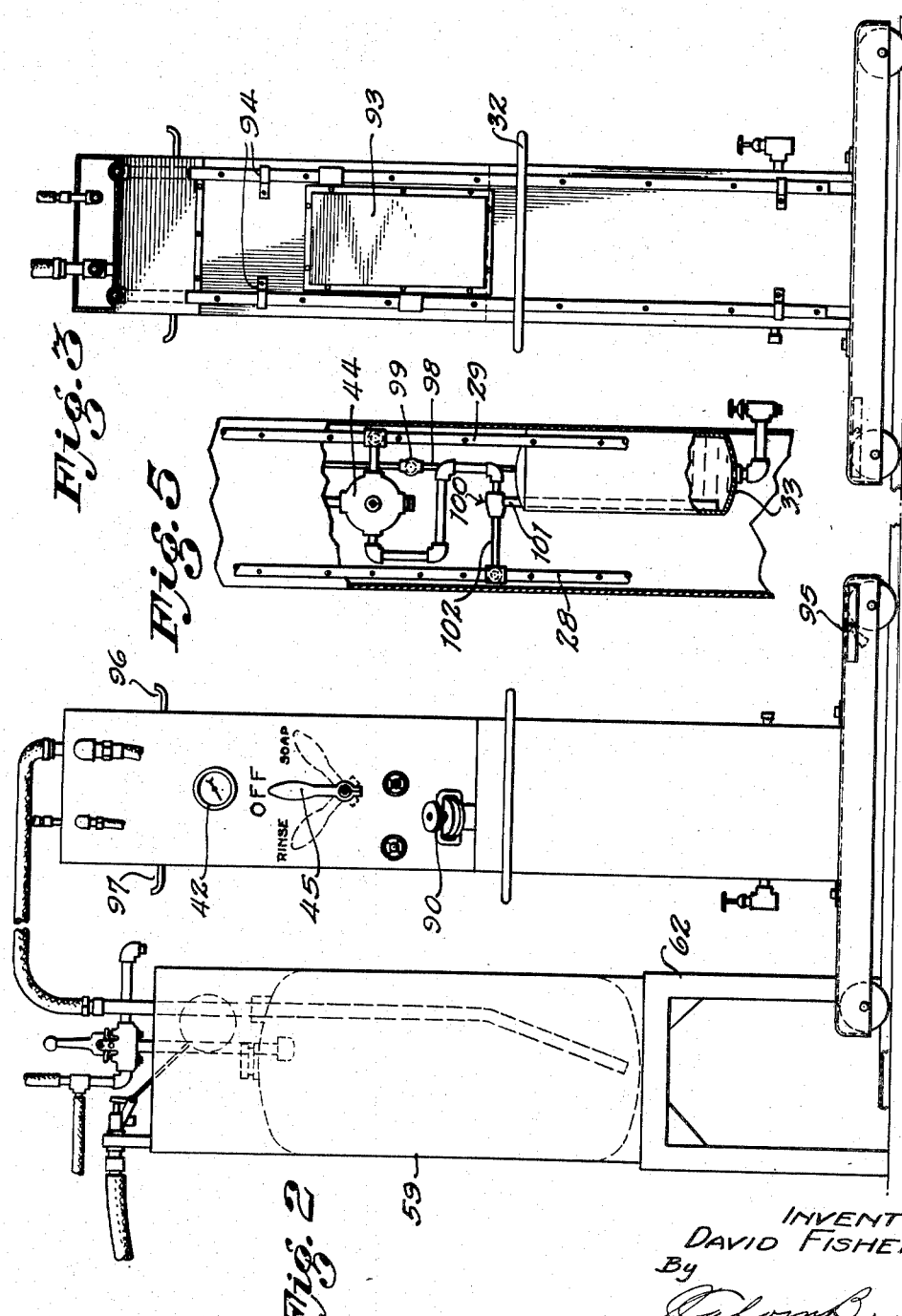

Jan. 18, 1955  D. FISHER  2,699,792
VEHICLE WASHER
Filed Nov. 14, 1949  3 Sheets-Sheet 3
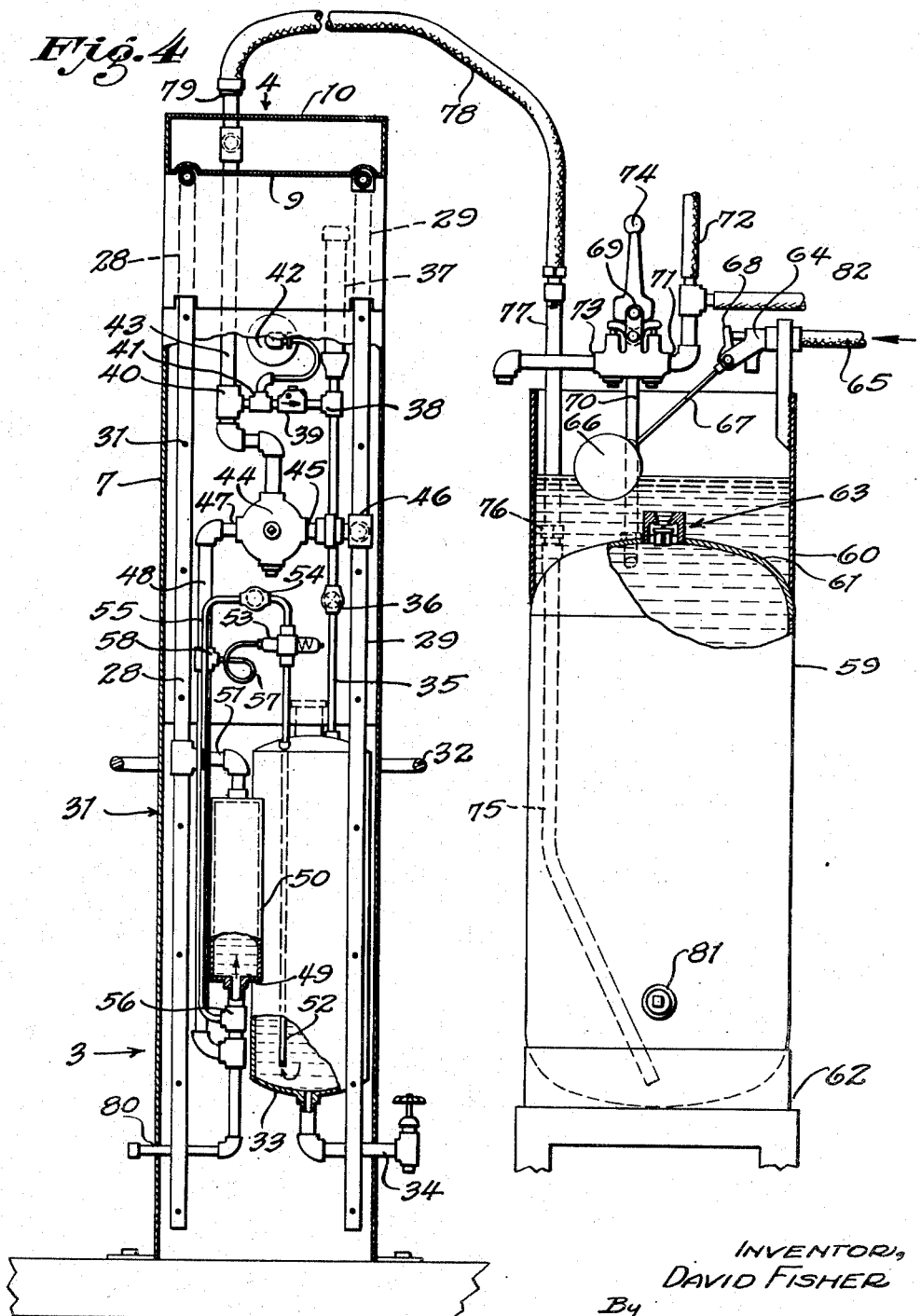
Fig. 4
INVENTOR,
DAVID FISHER
By
ATTORNEY.

United States Patent Office 2,699,792
Patented Jan. 18, 1955

2,699,792

VEHICLE WASHER

David Fisher, Los Angeles, Calif., assignor, by mesne assignments, to U. S. Washmobile, Newark, N. J., a corporation of New Jersey Application November 14, 1949, Serial No. 127,227

4 Claims. (Cl. 134—56)

The present invention relates to a vehicle washer of the type which may be moved relative to the vehicle, the vehicle remaining stationary.

Preferably, and in one embodiment, I provide a vehicle washer of a type which is adapted to straddle the vehicle, and which washer is movable relative to the longest length of the vehicle. Such a washer occupies a minimum of space with the result that the usual washing area is not necessary. In other words, the actual space necessary is substantially the length of the vehicle to be washed, whether it be a truck, an ordinary passenger car, trailer, motorcycle, or other means of transportation. An object of the invention is to provide a vehicle washer which is at all times under the direct control of the operator and whereby during movement of the vehicle washer relative to a car, such as an automobile, the detergent may be sprayed onto the sides and the top of the said vehicle to thereafter be flushed from the said vehicle by a spray of water directed over the vehicle.

An object of the present invention is to provide means whereby a detergent and water may be delivered separately to the vehicle washer to be sprayed upon the vehicle.

A further object is to provide an improved means for maintaining water under pressure as well as maintaining a detergent under pressure for delivery to a vehicle washer.

A further object consists in the provision of means directly associated with the vehicle washer for delivering regulated amounts of detergent to the spray system of said washer.

A further object is to provide a system for a vehicle washer which is adaptable to different water pressures.

Another object is the provision of a vehicle washer which is sightly in appearance, fool-proof in operation, easily repaired, where all parts are readily accessible, and which is generally superior to vehicle washers now known to the inventor.

With the above mentioned and other objects in view, the invention consists in the novel and useful provision, formation, construction, association and relative arrangements of parts, members and features, all as shown in certain embodiments in the accompanying drawings, described generally and more particularly pointed out in the claims.

In the drawings:

Figure 1 is a fragmentary perspective view of the improved vehicle washer, shown in its entirety;

Figure 2 is a fragmentary side elevation showing one end of the vehicle washer in cooperation with a pressure tank for holding water and looking in the direction of the arrow 2 in Figure 1;

Figure 3 is a fragmentary and partially sectional view of the vehicle washer taken on the line 3—3 of Figure 1;

Figure 4 is a fragmentary, partially sectional view of the interior of one end of the frame of the vehicle washer and of a tank for holding water; and Figure 5 is a modified form of control unit for the vehicle washer.

The present invention contemplates an improvement upon the vehicle washer described in Patent No. 2,465,562, issued to William H. Hopper and Virgil R. Drake on March 29, 1949.

Referring now with particularity to the drawings and to Figure 1, the vehicle washer unit is designated as an entirety by 1. Said vehicle washer includes a casing of substantially inverted U-shaped form in that it has two side members 2 and 3 and an interconnecting top member 4. Both side members have inner and outer spaced side walls 5, 6, 7, 8 and the top member has a bottom wall 9 and a top wall 10. End walls designated generally as 11, 12 and 13 interconnect the side walls of members 2 and 3 and the top and bottom walls of the top 4. Preferably this casing is of steel welded construction and of a heavy-duty type so as to be rigid and withstand continued usage for volume washing. To assist in maintaining the sides and top in rigid connection web plates may be provided as indicated at 14. The sides 2 and 3 are supported on foot casings 15 and 16, of identical construction, which foot casings carry rollers 17 and 18, preferably of the ball-bearing type. The rollers are flanged so as to ride upon rails 19 and 20. These rails are adjustable as to gauge by means of spreaders 21 and 22. The spreaders include overlapping bars 23 and 24 and the bar 23 is provided with longitudinal slots 25 while the bar 24 carries bolts 26 passed through the slots and which bolts permit regulation of the spacing between the rails. The rails are provided with end blocks designated generally as 27 for the purpose of stopping movement of the washer unit at the excursion of its movement in two directions. A pair of spaced pipes 28 and 29 in substantial parallel relationship are adjacent side wall 5 of side member 2, passed through the web 14, are positioned adjacent the bottom wall 9 of top 4 and then passed through the web at 30 and along the side wall 7 of member 3. These pipes are held to the respective members in any suitable manner, such as by clamps, not shown, and said pipes are provided throughout their lengths with spaced nozzles 31. The nozzles are not detailed as various types are adaptable for use in the present invention. I have found the fan-type spray nozzle quite satisfactory, as it directs a fan-like spray onto the vehicle in a selected path. However, as stated, I do not limit my invention to any particular type of nozzle.

In the present instance, the side member 3 is provided with various controls for an operator, as hereinafter detailed, and said side member 3 has a portion of enlarged transverse dimension, here designated generally as 3a. This enlarged portion is provided with an encircling rail 32 which an operator may grasp for the purpose of moving the unit backwardly and forwardly on the rails 19 and 20. Referring to Figure 4, the casing for the side member 3 is adapted to enclose mechanism whereby, under the control of the operator detergent may be delivered under pressure through certain of the nozzles 31 for spraying upon a vehicle and likewise flush-water may be directed through other nozzles, under pressure, for washing away the detergent from the vehicle.

Suitably supported within the said casing of side member 3 is a tank 33 adapted to hold the detergent in solution which tank is provided with a valved-drain outlet pipe designated generally as 34 with the valved outlet exterior of the casing. A pipe 35 communicates with the said tank in the top thereof, the said pipe including within its length a metering valve 36, the pipe finally communicating with an air chamber member 37. A fitting 38 is included in the pipe length 35 and immediately below the air chamber member 37. A one-way check valve 39 communicates with fitting 38 and with a fitting 40, there being a fitting at 41 between the check valve 39 and fitting 40, the fitting 41 leading to a pressure gauge 42. The dial of the pressure gauge is externally visible as shown in Figure 1. The fitting 40 is interposed in a pipe 43, which extends outwardly of the top 4 of the unit. Pipe 43 through the medium of various connectors or fittings leads to a three-way valve designated generally as 44. The handle for controlling valve movement is shown in Figure 1 at 45. The valve is conventional in form, and therefore not detailed. When the handle is in the position shown in Figure 1, the valve stops flow of any liquid through the valve from pipe 43 and when moved to the right or left will direct liquid in a given path as hereinafter set forth. One outlet 45 of the three-way valve directly communicates with the piping 29, as shown at 46, while an opposite valve outlet 47 through the medium of a pipe 48 communicates with one end 49 of a mixing tank 50. The top of the tank through the medium of suitable pipes and fittings designated generally at 51 is in direct communication with pipe 28. It is intended that the detergent within the tank 33 should be directed into the mixing tank 50. This is accomplished by providing a small tube passed vertically through the tank 33 with its inlet adjacent the bottom of the tank as illustrated for said tube at 52. The tube includes within its length a pressure operated metering valve 53, a metering valve 54, and a tube 55 leading from said metering valve to a fitting 56 interposed between the pipe connection 48 and the tank 50 and communicating with the interior of said tank. The valve 53 has communication through a tube 57 and a fitting 58 with pipe 48.

The device just described operates in conjunction with a source of water under pressure and in the present instance, I have provided a tank 59 substantially cylindrical in form and provided in the present instance with a cylindrical portion 60 which rises above the convex head 61 of the tank. This tank is suitably supported by a base 62. The head 61 is formed with a drop valve 63 which remains open under gravity until the water reaches a certain height sufficient to raise the valve and close the same. Mounted on portion 60 is a valve 64 which communicates through a hose 65 with a source of water supply. The valve is opened or closed by means of a float 66 carried on an arm 67 which arm has a portion 68 permitting the opening or closing of the valve 64 depending upon float position. In the position for the float shown in Figure 4, water will pass through the valve and into the portion 60 and through the drop valve 63 into the tank 59 to fill the tank and after the water has reached a given level, the float upon rising, in the well understood manner, will close the valve and shut off further water supply thereto. However, the water is maintained under pressure within the tank 59 and this is accomplished by providing a two-way valve 69. Connected to the valve is a pipe 70, the outlet of the pipe being within the tank 59. One port of valve 71 is connected by suitable piping leading to a source of air under pressure. This connection is indicated at 72. The other valve port 73 acts to exhaust air from the tank. As shown, a manually operated lever 74 is provided, which, in Figure 4, is in a neutral position. The pipe 70 communicates with a zone within the valve casing intermediate the two valve controlled openings. Movement of the lever 74 will open one valve, the other valve being shut, or vice-versa. A pipe 75 extends downwardly within tank 59 with its inlet end adjacent the base of said tank. Pipe 75 through a union 76, external tank 59, and within cylindrical portion 60, communicates with a further length of pipe 77, which pipe in turn, by means of a suitable connector, has fastened thereto a flexible hose 78. This hose communicates with pipe 43, as shown at 79. It is intended that when the lever 74 is moved to the right viewing Figure 4, that air under pressure will be directed through pipe 70 into tank 59 to provide air pressure against the surface of the water contained therein. This pressure forces the water into the pipes 75, 77, and hose 78, directing the water through the check valve 39 into pipe 35 through the valve 36 and into tank 33. This tank contains a detergent supply, which under pressure is forced upwardly in pipe 52 and controlled in movement by the pressure valve 53, metering valve 54, and by means of piping 55, directed into mixing tank 50. Here the detergent is properly mixed in a selected proportion with water, passed through pipe 48 and under control of the valve 44. It is to be observed that the valve 54 is of the metering type and that the metering valve at 53 is of the pressure-operated type. In this manner a correct balance is maintained between the amount of detergent and water under pressure to be delivered through the nozzles 31.

As shown in Figure 4, I provide a capped end piping designated generally as 80, which communicates with the bottom of the tank 5 and likewise I have shown a drain plug 81 for the tank 59. These drains function in the usual manner and for the usual purpose.

Referring to Figure 1, the hose 78 together with hose 82 is carried by blocks 83 on a cable 84 which overlies the washer unit and extends substantially parallel with the rails, such as the rail 20. Obviously the overhead suspension for the hose members permits travel of the washer unit without any interference with the hose. As shown in Figure 1, both sides 2 and 3 of the washer unit are provided with hose members 85 and 86 which have valve controlled spray heads designated generally as 87 and which hose members 85 and 86 communicate with a source of water supply under pressure. Also the hose 82, for air under pressure, communicates with two auxiliary air hose members, one for each side of the washer unit, as shown at 88 and 89. These hose members will carry the usual heads whereby the operator of the washer unit may under certain circumstances remove water from the vehicle, such as may accumulate around the trim thereof.

Externally the filler plug for tank 33 is shown at 90. The metering valve control handle is at 91 and the detergent tank filler valve control at 92.

Referring now specifically to Figures 2, 3 and 5, the inner face 7 of side 3 is provided with a removable inspection door 93, this door permits ready access to the interior of side 3 for adjustment of the mechanism within the side or for ready replacement thereof. In the present instance, I prefer to attach the door along its marginal edges by means of bolts secured to the inner face 7, however, other means may be utilized. Figure 3 likewise shows that the pipes 28 and 29 may be held by means of clips 94 which are detachably secured to the inner faces of the casing parts to facilitate removal of said pipes if the necessity should arise. These figures also show that the carriage for the washer unit may be provided with brakes as indicated at 95, of any character, for stopping motion of the washer unit. No particular type of brake is detailed as brakes are conventional in the art. It is also conventional to provide hooks as shown at 96 and 97 for holding various instrumentalities, such as the nozzles 87 and the hose 89. This is a mere refinement of detail to render the complete washer unit compact with all parts readily accessible to the operator thereof and whereby he may more efficiently wash a vehicle within a minimum of time. The average system for washing vehicles entails the use of many operators at different stations which are remote from each other. The present invention overcomes such remote stations by providing in a single unit all necessary devices for the complete washing of a vehicle, such as first spraying the vehicle with water, thereafter applying a detergent, followed by rinsing. If the vehicle is very dirty, any operation may be repeated which is impossible to accomplish in the station system as each operator had a definite task. Wiping of the vehicle with a chamois skin or cloth is usually necessary and the use of air under pressure is provided in the vehicle unit, when such use is required.

In Figure 5, I have shown a system which may be incorporated and which system does not embody the use of extensive apparatus, as shown for instance in Figure 4. As many of the parts in Figure 5 are the same as that shown in Figure 4, the same reference numbers will be applied where possible. In the detail of Figure 5, the tank 33 as before holds the detergent and a pipe 98 directly communicates with the interior of said tank, the said pipe incorporating a metering device 99, comparable to the device shown at 36, the said pipe in turn communicating with water under pressure, such as through hose 78, shown in Figure 4. The three-way valve 44 also communicates with water under pressure in the manner shown in Figure 4, with one valve in direct communication with pipe 29 which has nozzles for spraying water therefrom, while the other valve communicates with an eductor 100. This eductor has pipe 101 leading to the interior of tank 33, the said inlet of said pipe 101 being adjacent the base of said tank. The outlet of said eductor is in pipe connection at 102, with pipe 28. In this system, I do away with the mixing tank 50 of Figure 4 and certain other devices, such as the one-way valve 39, the pressure valve 53, and metering valve 54. For certain installations, where cheapness is required, it has been found that the system depicted in Figure 5 works in a satisfactory manner. The outer face of side 3 is shown in Figure 2 and the controls remain the same as described for Figure 1. Also the tank for holding water under pressure is of the same construction.

The operation, uses and advantages of the invention just described are as follows:

To prepare the apparatus for use, the tank 59 is first filled with water; the water being supplied from a main which conducts the water through hose 65 to the ball float operated valve 64. The water will pass through the drop valve 63 into said tank filling the same and likewise will fill to a certain height, the cylindrical member 60. The float upon rising, will close the valve and stop water flow. The lever 74 is then moved to the right, viewing Figure 4, to supply air under pressure within the tank 59, to place the water under pressure. The construction is such that movement of the lever 74 to the left will permit the opposite valve to open so as to bleed air from the tank, if this should be necessary. Assuming that the water is under pressure, the water is directed through hose 78 into the mechanism within casing side 3. The water pressure may be observed by viewing the dial of the pressure gauge at 42 and assuming that the detergent valve has been opened by turning the wheel 91, the water under pressure is directed into the tank 33, which holds detergent. Obviously, the tank is assumed to have been filled with detergent through the filler plug 90. The detergent is now under a pressure sufficient to cause it to pass upwardly through the tube 52 under regulation of the pressure valve 53 and the metering valve 54, thence through fitting 56 into the mixing tank 50. The mixing tank has connection at the top 48 with the three-way valve 44. If the operator moves the handle 45 to the right, viewing Figure 1, water under pressure will be directed through the pipe 48 and into the mixing chamber to mix with the detergent and direct the detergent into the pipe 28 whereupon the solution is sprayed directly outwardly from the nozzles 31 against the sides of the vehicle to be washed and directly downwardly on the top of the vehicle. During this period, the operator, by grasping the hand rail 32, moves the washer unit along the rails 19 and 20 from one end of the vehicle to the other. Following the spraying of the vehicle with the detergent solution, the operator may move the handle 45 to the left, viewing Figure 1, which will open the opposite valve of the three-way valve 44, closing passage of the detergent solution through pipe 28, and directing flushing water into pipe 29, which is passed outwardly of said pipe through the various nozzles or jets. The washer unit is moved again longitudinally of the vehicle one or more times to completely cleanse the vehicle of detergent solution. Thereafter, the valve lever 45 assumes the vertical position shown in Figure 1, which cuts off any passage of either water or detergent solution through the pipes 28 and 29. The vehicle may then be dried in the ordinary manner.

In Figure 5, I have shown use of an eductor of ordinary type, whereby regulated amounts of detergent solution may be directed through the pipe 28 in accordance with movement of the valve handle 45.

I have shown within side 3 various instrumentalities as shown in Figure 4 or Figure 5. It is apparent that I might duplicate such apparatus in the side 2. It is also within the purview of my invention to completely segregate the apparatus within the side 3, in the same manner as I have segregated the tank 59. In such an arrangement, it is obvious that the only change would be in providing a hose to take the place of pipe 51, which hose would have a direct connection with the pipe 28, and, in the second instance, the hose would run from the valve 44 to the pipe 29. The controls, however, such as the lever 45, could still be maintained on the side of the unit by substituting hose connections with said three-way valve in place of pipe connection, as shown in Figure 4 or 5. Such a construction is obvious, and where space is exceedingly limited, the tank 59 could be housed exteriorly of the space for the vehicle washer, as may likewise be so located the various mechanisms of Figure 4. The overhead conveyor system for holding the flexible hose member provides an easy means for placement of the detergent and water supply means other than in the compartment for the washer per se.

I claim:

1. A vehicle washer including: an inverted U-shaped casing having spaced side walls, end walls and interconnecting side walls; a pipe carried by the inner walls of said casing; said pipe provided with spaced-apart jets, a supply tank for holding a detergent, a source of water supply under pressure, means for directing said water into said detergent supply tank, a mixing tank, an outlet leading from the detergent supply tank to the mixing tank, means for directing water under pressure to the mixing tank, means included in the outlet of said detergent tank and controlled by pressure of water directed to the mixing tank for controlling the ratio of detergent and water delivered to said mixing tank, and means for directing under valved control the solution of detergent to the pipe provided with jets.

2. A vehicle washer including a casing provided with spaced side walls and end walls interconnecting the side walls, a pipe carried by the inner walls of said casing, the pipe being provided with spaced jets, a supply tank for detergent within the walls of the casing, a mixing tank within the walls of the casing and in communication with the detergent supply tank, a source of water supply under pressure, means for directing the water under pressure to the mixing tank, means included in the outlet of the detergent supply tank and controlled by pressure of water directed to the mixing tank for controlling the ratio of detergent and water delivered to the mixing tank, and means for directing the solution of detergent to the pipe provided with the jets.

3. A device as set forth in claim 1, in which a second pipe, provided with spaced apart jets, is carried by the inner walls of said casing, and wherein the last named means includes a three-way valve for directing clear water, when the valve is moved in one direction, through the second pipe and its jets, and when the valve is moved to a second position, directing the water to the mixing tank.

4. The vehicle washer as set forth in claim 1, characterized in that the means for directing water into the detergent supply tank includes a pipe in direct connection with the source of water under pressure, and a one-way valve and a metering valve in said pipe.

References Cited in the file of this patent

UNITED STATES PATENTS

| Number | Name | Date |
|---|---|---|
| 238,223 | Fogg | Mar. 1, 1881 |
| 1,698,248 | Tweit | Jan. 8, 1929 |
| 2,157,581 | Wheeler | May 9, 1939 |
| 2,221,876 | Mackin | Nov. 19, 1940 |
| 2,316,781 | Fox | Apr. 20, 1943 |
| 2,316,848 | Evans | Apr. 20, 1943 |
| 2,376,565 | Williams | May 22, 1945 |
| 2,462,752 | Kotches | Feb. 22, 1949 |
| 2,465,562 | Hopper et al. | Mar. 29, 1949 |
| 2,518,654 | Backus | Aug. 15, 1950 |
| 2,570,021 | Beach | Oct. 2, 1951 |